Sept. 13, 1938. W. R. LUSTIG 2,129,952
ADJUSTABLE SEAT
Filed Aug. 8, 1936
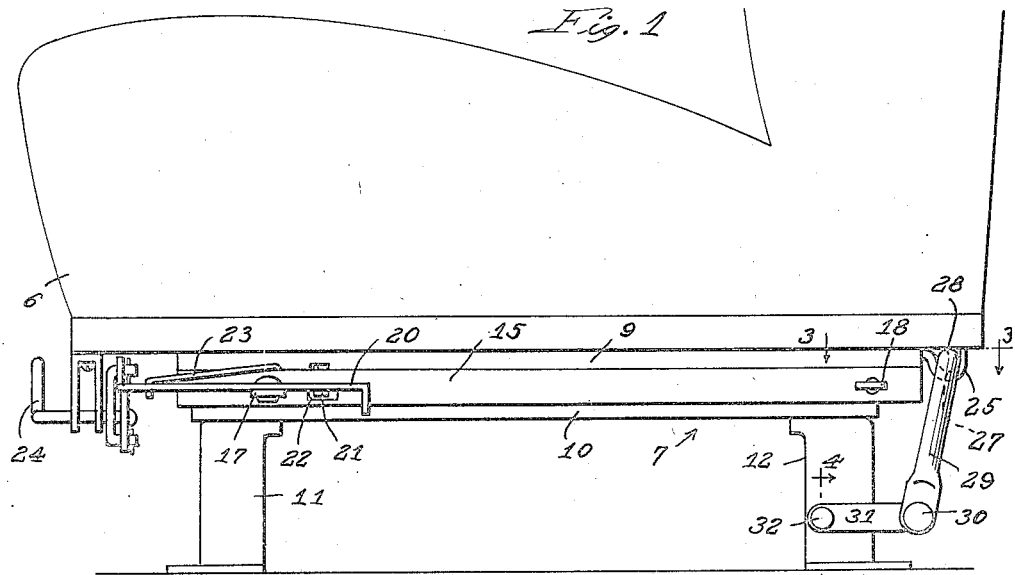
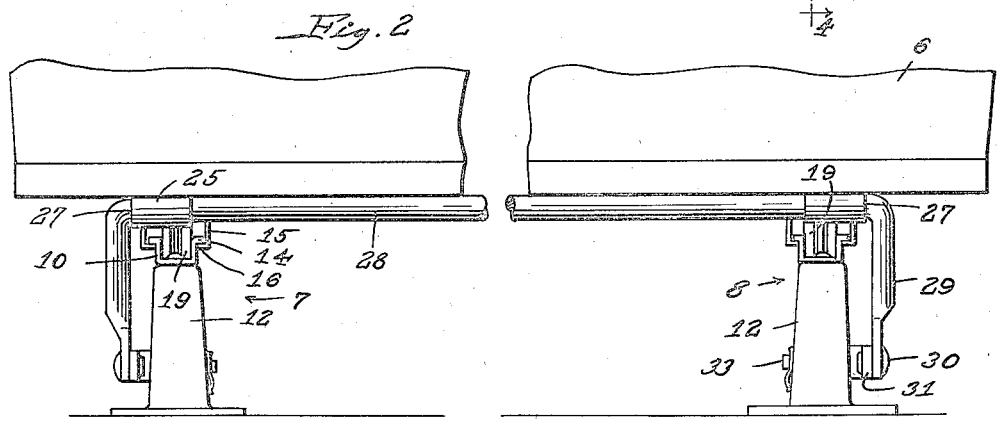
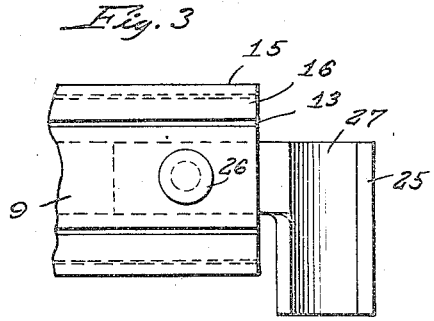
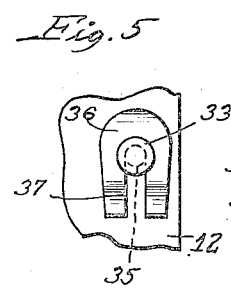
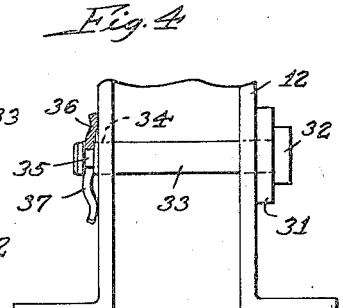
Inventor:
Walter R. Lustig
By Wilson, Sowell, McCanna & Wintercorn
Attys.

Patented Sept. 13, 1938

2,129,952

UNITED STATES PATENT OFFICE 2,129,952

ADJUSTABLE SEAT

Walter R. Lustig, Rockford, Ill., assignor to The Atwood Vacuum Machine Company, Rockford, Ill., a copartnership composed of Seth B. Atwood and James T. Atwood Application August 8, 1936, Serial No. 94,923

2 Claims. (Cl. 155—14)

This invention relates to adjustable seats of the type now commonly used in automobiles wherein the seat slides or rolls forwardly or rearwardly to suit the driver or to facilitate loading and unloading of rear seat passengers.

In such seats, especially in the case of a two-passenger or full width seat, equipped with slides at opposite ends, the operation is often difficult and jerky, because of the tendency of the slides to bind, especially when the thrust is applied at one end of the seat or on either side of the middle. It is therefore the principal object of my invention to provide an equalizer for an adjustable seat of the kind mentioned, whereby any movement transmitted to one slide results in a simultaneous equal movement of the other slide, and the adjustment is accordingly made smoother and easier.

The invention is illustrated in the accompanying drawing, in which—

Figure 1 is a side view of an adjustable vehicle seat equipped with an equalizer in accordance with my invention;

Fig. 2 is a rear view of Fig. 1 with an intermediate portion of the seat and equalizer rod broken away to permit showing the parts on a larger scale;

Fig. 3 is a sectional detail on the line 3—3 of Fig. 1, showing one of the bearings for the equalizer rod;

Fig. 4 is a vertical sectional detail on the line 4—4 of Fig. 1, showing the link connection between one of the equalizer arms and the adjacent leg of the seat slide track, and Fig. 5 is a side view of Fig. 4.

The same reference numerals are applied to corresponding parts throughout the views.

The seat 6 is herein illustrated as mounted on supports 7 and 8 of the type disclosed in the co-pending application of James T. Atwood and Donald E. Crabb, Serial No. 83,574, but, of course, the present invention is not limited to use with supports of that specific construction, but may be used to equal advantage with any seat that is adjustable on two supports in a generally similar way, wherever the supports are under the opposite ends or sides of the seat and would have a tendency to bind in the absence of means for equalizing the movement of the seat with relation to the two supports. Each support, as disclosed in the aforesaid application, consists of a slide 9 movable lengthwise relative to a track 10 supported at opposite ends on legs 11 and 12, suitably of hollow sheet metal construction for lightness and economy. The slides 9 and tracks 10 are formed from sheet metal to channel-shaped cross-section, the slides being inverted and having outwardly bent longitudinal flanges 13 (Fig. 3) parallel to similar outwardly bent longitudinal flanges 14 on the tracks 10. Side members 15 formed from sheet metal to channel-shaped cross-section provide longitudinal flanges 16 for engagement above and below the flanges 13 and 14 to hold the slides and tracks against displacement from assembled relationship, and these side members are held in place by ties 17 and 18 extending crosswise between the flanges 13 and 14, as fully set forth in the aforesaid application. Rollers 19 constitute rotary spacing means between the slide and track of each support and operate in the channels thereof. The lever indicated at 20 as pivoted on the tie 17 has a lug 21 projecting therefrom through an opening 22 in the adjacent side member 15 for engagement in any one of a plurality of longitudinally spaced notches (not shown) provided therefor in the track 10. A wire spring 23 normally urges the lever 20 toward locked position. An operating handle 24 mounted on the bottom of the seat 6 at the front is suitably connected with the lever 20 to move it in the opposite direction so as to release the seat to slide in either direction. No invention is claimed herein in the construction thus far described, except in so far as the details thereof form a part of the novel combination and arrangement of parts hereinafter described.

In accordance with my invention, I provide two sheet metal brackets 25 suitably secured to the slides 9 by rivets 26 passed through the top wall thereof. The projecting portions of the brackets are formed, as best appears in Fig. 1, to provide aligned transverse bearings 27 adjacent the rear ends of the slides to receive an equalizer rod 28 with a working fit. The two ends of the rod are bent at right angles to form arms 29 pivotally connected, as at 30, with links 31 that are in turn pivotally connected at 32 to the legs 12. The pivots 32 are provided by headed pins 33 passed through registering holes 34 in the opposite sides of each leg 12, as best appears in Fig. 4, and having an annular groove 35 provided in the projecting end to receive a spring lock washer 36. The washers 36 are forked, as indicated at 37, to permit entering the grooved ends of the pins 33 therein. In that way, the assembly can be completed quickly and easily, and one may also take the same apart readily should the occasion for it arise, as, for example, if it is desired to remove the seat from the car.

In operation, when the seat is to be adjusted forwardly or rearwardly to suit the driver, or the seat is moved forwardly to provide passageway behind the seat for the loading or unloading of rear seat passengers, the handle 24 is operated to move the lever 20 to released position, whereupon the seat may be adjusted or moved as desired. Now, regardless of whether the seat is moved from one end, as from the outside of the car with the door opened, or is moved by someone sitting on the seat on the right or left-hand side, there can be no binding of the slides 9 relative to the tracks 10 as was otherwise apt to occur; the equalizer rod 28 through its arms 29 and connecting links 31 forms a positive cross-connection between the supports 7 and 8 to insure simultaneous and equal movement of both slides 9 relative to their tracks 10, thus making for smooth and easy operation. Obviously the addition of the equalizer rod and link connections means very little added cost, and, since the equalizer is mounted on the bottom of the seat at the rear, it is out of the way and inconspicuous. The link connections permit movement of the seat in either direction through the usual range, which no doubt is obvious from an inspection of Fig. 1. They also serve a useful purpose in positively limiting the movement of the seat so that any other limiting stops which would otherwise be necessary can be dispensed with, if so desired.

It is believed the foregoing description conveys a good understanding of the objects and advantages of my invention. While I have illustrated the equalizer rod as rotatably supported on the seat and connected by links to the stationary supporting legs, it should be evident that the arrangement might be reversed, that is, the equalizer rod could be rotatably supported on the legs and connected by links to the slides or seat. The appended claims have been drawn with a view to covering all legitimate modifications and adaptations.

I claim:

1. An equalizer for a slidable seat structure of the type comprising laterally spaced floor brackets, a pair of lower channel tracks rigidly supported on top thereof and slidably supporting inverted channel slides secured to the bottom of a slidably adjustable seat, there being anti-friction rollers entered between said channel tracks and slides, said equalizer comprising an inverted U-shaped equalizer rod the cross-portion of which extends transversely with respect and in close proximity to the ends of said inverted channel slides and the two arms at opposite ends of which reach downwardly alongside said floor brackets, links pivotally connected to the lower ends of said arms and pivoted to said floor brackets, and a pair of brackets projecting from and secured in the ends of the channels in said slides and providing substantially half-round elongated transverse bearing portions for engagement under the cross-portion of the equalizer rod at the opposite ends thereof, confining said rod with freedom for oscillatory movement between the bearing portions and the bottom of the seat.

2. An equalizer for a slidable seat structure of the type comprising laterally spaced floor brackets and a pair of seat slides over said brackets secured to the bottom of a slidably adjustable seat, said equalizer comprising an inverted U-shaped equalizer rod disposed with the cross-portion thereof directly beneath the bottom of the seat and with the two arms at opposite ends thereof reaching downwardly alongside said floor brackets, links pivotally connected to the lower ends of said arms and pivoted to said floor brackets, and a pair of supporting brackets on the seat slides having engagement with the opposite ends of the cross-portion of the equalizer rod to support the same for oscillatory movement.

WALTER R. LUSTIG.